Patented Aug. 4, 1936

2,050,169

UNITED STATES PATENT OFFICE 2,050,169

HIGH-MOLECULAR SULPHUR COMPOUNDS AND PROCESS OF MANUFACTURING THE SAME

Eberhard Elbel and Ernst Ludwig Müller, Dusseldorf, Germany, assignors to firm Henkel & Cie., G. m. b. H., Dusseldorf, Germany No Drawing. Application December 6, 1932, Serial No. 646,027. In Germany December 15, 1931

5 Claims. (Cl. 260—112)

It has been found that a new class of valuable organic compounds may be obtained by treating the esters, which are obtained from high-molecular hydroxy-compounds containing at least eight carbon atoms and oxygen-containing mineral acids, or salts of such esters, with sulphide compounds containing the SX-group where X is a monovalent inorganic residue.

Such esters are for example the sulphuric acid or phosphoric acid esters of high-molecular alcohols, such as octyl alcohol, lauric alcohol, myristic alcohol, furthermore, esters of paraffin alcohols or other saturated or unsaturated high-molecular primary, secondary and tertiary alcohols. Esters with branched chains, such as for example esters of iso-octyl alcohol or esters of hydroaromatic compounds, such as resin alcohols, naphthene alcohols etc. may be converted by this reaction.

The esters enumerated in the foregoing may also be substituted by groups of any kind, provided only that such groups do not have any unfavorable effect on the reaction. Such groups are for example ether groups, carboxyl groups, sulpho-groups, oxy-groups, amino-groups and the like. Also, polyvalent esters of the type specified may be converted with the same success.

The reaction of the said esters with hydrosulphides, sulphides, or polysulphides may be effected, for example by dissolving the components in water and heating in an autoclave under pressure. It is also possible to carry out the process by dissolving the components in a suitable solvent, for example alcohol or the like, and treating them for a long time at an elevated temperature.

The reaction between the said esters and hydrosulphides, such as NaHS and KHS, leads to the corresponding mercaptans. The reaction with sulphides, such as $Na_2S$ and $K_2S$ leads to the corresponding high-molecular sulphides. The reaction with polysulphides, such as for example $Na_2S_2$ and $Na_2S_4$ leads to high-molecular organic polysulphides.

As mercaptans, it is possible to employ mercaptans of the aliphatic, hydroaromatic, aliphatic-aromatic, aromatic and heterocyclic series.

For example, the following may be employed: ethyl mercaptan, dodecyl mercaptan, p-tolyl mercaptan, cyclohexyl mercaptan, 2-naphthyl mercaptan, benzyl mercaptan, quinolyl mercaptan and the like.

The mercaptans may be substituted by groups of any kind, provided that such groups do not have an unfavorable effect on the reaction. Such groups are, for example: ether groups, sulpho-groups, amino-groups, carboxyl groups, oxy-groups and the like.

The reaction between the aforesaid esters and the mercaptans leads to the corresponding sulphides. It is possible to make either symmetrical or mixed sulphides.

It is also possible to convert mixtures of the various esters, and in this way sulphide mixtures are obtained.

The new compounds possess to some extent emulsifying properties. They may be employed inter alia as agents in the rubber industry, and furthermore in the pharmaceutical industry, as softening agents, and so on. They also serve as starting substances for further valuable organic conversion products. Thus, for example, the new mercaptans may easily be converted into the corresponding alkyl mercapto-acetic acids, the sodium salts of which have a high foam-producing power and a high wetting power.

Examples (1) 64 parts by weight of the sodium salt of the sulphuric acid ester of dodecanol-1 (90.25 per cent.) are mixed with a solution of 8.1 parts by weight of caustic soda (99 per cent.) in 45 parts of water, the said solution being saturated with hydrogen sulphide, and are heated in an autoclave for about 3 hours at 170° to 180° C. The reaction mass consists of two layers. The oily layer is separated from the aqueous layer and is worked up by known methods into the pure mercaptan. The dodecyl mercaptan-1 is liquid and has a boiling point of 142° to 145° C. under 15 mm. pressure.

In the same way as with the sulphuric acid ester of dodecanol-1, dodecyl mercaptan-1 may be obtained by starting with the phosphoric acid ester of dodecanol-1.

The dodecyl mercaptan obtained may readily be converted into dodecyl mercapto-acetic acid by treatment with chloracetic acid. The sodium salt of dodecyl mercapto-acetic acid has a very excellent foam-producing power and an outstanding wetting power.

(2) 12.4 parts by weight of p-thiocresol are dissolved in a solution of 4 parts by weight of caustic soda (99 per cent.) in 64 parts by weight of 50 per cent. alcohol, and are mixed with 32 parts by weight of the sodium salt of the sulphuric acid ester of dodecanol-1 (90.25 per cent.). The mixture is heated in an autoclave for 3 hours at 170° to 180° C. The crude reaction product, p-cresyl-dodecyl-sulphide, is obtained in the form of a light coloured oil which floats on the aqueous-alcohol mother liquor (yield 28.4 parts by weight). The product may be purified by recrystallization from a mixture of methyl alcohol and acetone in the proportion of 1:1. The melting point of the pure substance is 29.6° C.

(3) 28.8 parts of sodium dodecyl sulphate and 9.2 parts of mercapto-acetic acid are added to a solution of 8 parts of NaOH in 80 parts of alcohol + 40 parts of water and are heated for 3 to 4 hours in the autoclave, the external temperature being 210° C.

The paste which is formed is filtered with suction, taken up with water and filtered. The product is then precipitated from the aqueous solution by common salt and recrystallized from a little alcohol. It constitutes a pure white, water-soluble substance having a good foam-producing power.

It is already known to treat alkyl-sulphuric acids or their salts in the lower members of the fatty series with metallic sulphides for the purpose of making sulphides. The products thus obtained have not heretofore acquired any technical significance. On the contrary, the high-molecular sulphur compounds obtained by the process according to the present invention possess technically valuable properties.

We claim:—

1. A process for the manufacture of aliphatic sulphur compounds, which contain at least eight carbon atoms, characterized in that the oxygen-containing inorganic acid esters of high-molecular aliphatic alcohols containing at least eight carbon atoms, are treated with sulphide compounds of the general formula RSX, where R represents an aliphatic radical containing 2 to 12 carbon atoms, and X represents a hydrogen atom or an alkali metal atom.

2. A process for the manufacture of aliphatic sulphur compounds, which contain at least eight carbon atoms, characterized in that the salts of the oxygen-containing inorganic acid esters of high-molecular aliphatic alcohols containing at least eight carbon atoms, are treated with sulphide compounds of the general formula RSX where R represents an aliphatic radical containing 2 to 12 carbon atoms, and X represents a hydrogen atom or an alkali metal atom.

3. A process for the manufacture of an aliphatic sulphur compound, which contains more than eight carbon atoms, characterized in that sodium dodecyl sulphate is treated with mercapto-acetic acid in an alcoholic-aqueous solution of caustic soda.

4. As new products of manufacture high molecular organic sulphur compounds of the structural formula RSX, where R represents an alkyl radical of at least eight carbon atoms and X represents a carboxyalkyl radical.

5. A new product of manufacture consisting of dodecyl mercapto-acetic acid.

EBERHARD ELBEL.
ERNST LUDWIG MÜLLER.